United States Patent

[11] 3,621,892

[72] Inventor Thomas J. Gillespie
       8212 131st Way North, Seminole, Fla. 33540
[21] Appl. No. 855,231
[22] Filed Sept. 4, 1969
[45] Patented Nov. 23, 1971

[54] RESIN VACUUM DEGASSING AND DISPENSING SYSTEM AND METHOD
4 Claims, 4 Drawing Figs.

[52] U.S. Cl. .................................................. 141/7,
       141/9, 141/51, 141/107, 222/145, 222/318, 251/61.1, 264/102
[51] Int. Cl. ......................................................... B65b 31/00
[50] Field of Search .......................................... 137/624.18;
       141/51, 59, 107, 7, 9; 222/53, 134, 145, 152, 190, 318; 251/61.1; 264/101, 102; 18/30 CM, 30 V, DIG. 60

[56] References Cited
UNITED STATES PATENTS

| | | | |
|---|---|---|---|
| 1,991,009 | 2/1935 | Browne et al. | 264/101 X |
| 3,200,180 | 8/1965 | Russ et al. | 264/102 |
| 3,229,445 | 1/1966 | Kraft | 264/102 X |
| 3,390,813 | 7/1968 | Alderfer | 222/318 X |
| 3,521,789 | 7/1970 | Kraft | 222/134 X |

FOREIGN PATENTS

| | | | |
|---|---|---|---|
| 587,581 | 11/1959 | Canada | 251/61.1 |
| 801,182 | 9/1958 | Great Britain | 264/102 |

*Primary Examiner*—Edward J. Earls
*Attorney*—Roland A. Anderson

ABSTRACT: Resin dispensing system including resin vacuum degassing apparatus, a porting mechanism coupled to the degassing apparatus having an outlet and an inlet and interconnecting passageways controlled by diaphragm valves for each resin component, an evacuated mixing chamber coupled to the porting mechanism outlets and to a dispensing nozzle, the dispensing nozzle being coupled to an evacuatable chamber for receiving the mixed resin components.

PATENTED NOV 23 1971  3,621,892

*INVENTOR.*
THOMAS J. GILLESPIE
BY
*Attorney*

RESIN VACUUM DEGASSING AND DISPENSING SYSTEM AND METHOD

BACKGROUND OF THE INVENTION

It is desirable in dispensing mixtures of synthetic resin components for such purposes as the encapsulation or impregnation of components, that the resin mixture or resin system be dispensed or poured over the component under a vacuum to minimize contaminants and voids within the resin system after curing. In previous attempts to dispense resin mixtures under vacuum, the resin mixture being dispensed often was accompanied by excessive foaming of the resin. Such foaming may cause the resin material to bubble out or splatter beyond the confines of the component being encapsulated and thus prevent reliable programming of the quantity of encapsulating material used for a particular application and may also cause a significant amount of voids in the cured resin. This foaming of resin may be caused by excessive moisture and dissolved gas within the resin.

The dispensing of resin mixtures under vacuum may also produce other undesirable side effects which are not overcome by present techniques and apparatus. Such side effects include cracking of the resin during the cure cycle and incomplete curing of the resin. These effects may be produced by inconsistencies in the resin component mixing ratios caused by metering inaccuracies in the mixing head of the dispenser. Such metering inaccuracies may be difficult to detect or predict because of problems associated with dispensing fluids from an area at one pressure level to an area at another pressure level. Metering is found to vary from calibration tests to actual use and between successive uses under what appear to be the same or similar operating conditions.

SUMMARY OF INVENTION

In view of the limitations of the prior art as noted above, it is a purpose of this invention to provide a system for accurately dispensing resin mixtures under a vacuum.

It is a further purpose of this invention to provide a resin dispensing system which prevents or minimizes foaming of the dispensed resin mixture in a vacuum.

Various other objects and advantages will appear from the following description of one embodiment of the invention, and the most novel features will be particularly pointed out hereinafter in connection with the appended claims.

The resin dispenser of this invention comprises a resin component vacuum degassing apparatus for each resin component, a porting mechanism coupled to each degassing apparatus having an outlet and an inlet and interconnecting passageways controlled by diaphragm valves for each resin component, an evacuated mixing chamber coupled to the porting mechanism outlets and to a dispensing nozzle, and an evacuatable chamber communicating with said nozzle for receiving the mixed resin components.

DETAILED DESCRIPTION

Figure 1:
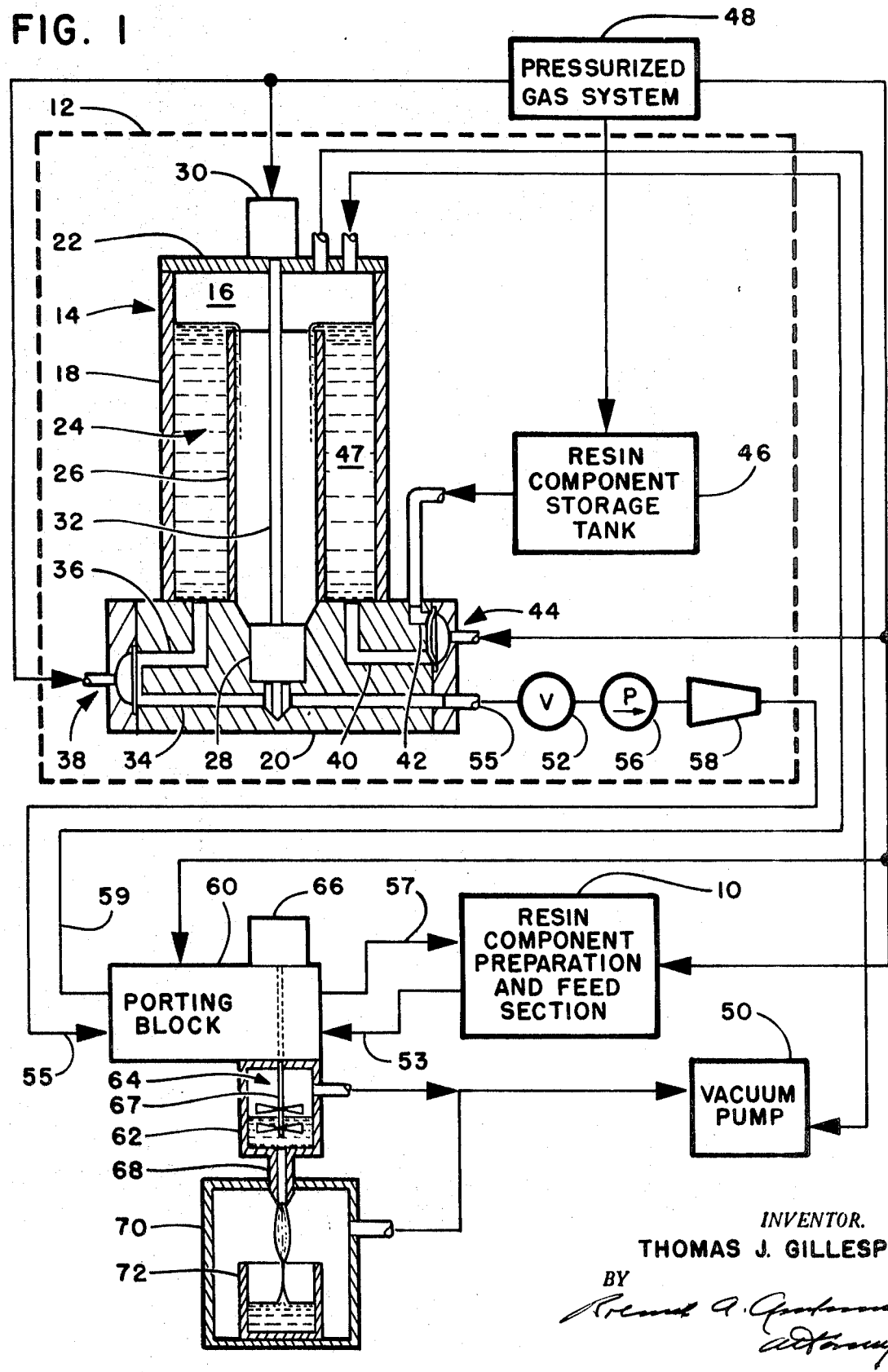
FIG. 1 is a diagrammatic view, having portions in cross section, of the entire resin dispensing system of this invention.

The resin dispensing system illustrated in the drawing includes apparatus to thoroughly degas resin components to remove causitive foaming agents inherent in resin components and mixtures and then maintain the resin components under vacuum throughout the transporting and mixing of the components and finally the dispensing of the resin mixture into an appropriate container, mold or other utilization means.

The resin dispensing system includes similar resin component preparation and feed sections for each resin component. These preparation and feed sections are shown in FIG. 1 diagrammatically by box 10 for one component and in detail by the apparatus within dotted lines 12 for another component. It will be readily apparent that additional resin component preparation and feed sections may be used where the final resin mixture includes more than two components, within the principles of this invention.

Each resin component preparation and feed section, such as section 12, may include a suitable liquid film degasser 14 for initially degassing and maintaining degassed a supply of a resin component in degasser 14. Degasser 14 includes a vacuum chamber 16 formed by an outer wall or walls 18 vacuum sealed to a base member or block 20 and a cover plate 22. A generally annular channel 24 may be formed within chamber 16 by a tubular member 26 suitably supported and mounted on base member 20. A recirculation pump 28 may be disposed within tubular member 20 at the bottom thereof in an appropriately formed channel within base member 20. Pump 28 may be driven by any conventional drive motor such as by air-driven motor 30 and shaft 32. The discharge of pump 28 may be connected through passageways or bores 34 and 36 and valve 38 to channel 24.

Channel 24 may also be connected by passageways or bores 40 and 42 and valve 44 to the discharge piping of the resin component storage tank 46. Channel 24 may be filled by the resin component with an initial supply which fills passageways 34, 36 and 40 and channel 24 to the top of tubular member 26 as shown by resin component 47. Additional resin component may be fed to degasser 14 as needed.

Valves 38 and 44 may be any conventional fluid pressure activated, diaphragm valves. The activating pressure may be derived from a suitably controlled pressurized air or gas system 48. Pressurized system 48 may also be used to drive motor 30 and to expel resin component from storage tank 46.

In the operation of degasser 14, chamber 16 may be evacuated to a pressure sufficiently low for desorption of contaminants like gas or moisture such as to about 0.5 torr by an appropriate vacuum pump 50. Motor 30 may then drive pump 28 to circulate the resin component from within tubular member 26 through passageway 34, valve 38 and passageway 36 to channel 24. The resin component will then flow over the top and down the interior surface of tubular member 26 in a thin film of about 10 to 30 mils thick, which may depend in part on the viscosity of the resin component, the circulation rate of pump 28 and the diameter of tubular member 26. As the film flows along the interior surface of tubular member 26, the resin component is substantially degassed. Degasser 14 may be run and the resin component recirculated on a semicontinuous basis after the initial resin component is degassed or continuously since the resin supply may be periodically replenished with possibly contaminated additions from storage tank 46.

As resin components are needed for dispensing, the degassed resin component may be drawn from passageway 34 of degasser 14 by opening valve 52 in line 55. By regulating the gas pressure to valve 38, the pressure of the resin in line 34 flowing out of valve 52 can be controlled, since the amount of gas pressure applied to valve 38 determines the amount of resin recirculated to channel 24. It may be desirable to monitor the amount or volume of resin component fed from degasser 14, such as through the flow meter 58 and the conventional metering pump 56, the output of which is of sufficient pressure to supply resin to the porting block 60 and to recirculate the resin within the degasser 14. The degassed resin components from preparation sections 10 and 12 (and any additional preparation sections) fed by lines 53 and 55 to the porting mechanism or block 60 are precisely metered therein, as described below in detail with respect to FIGS. 2 and 3, and discharged into a mixing section such as mixer 62.

Unused resin components may be returned to the preparation sections 10 and 12 and their respective degassers by recycling lines 57 and 59, respectively.

Mixer 62 may be of any suitable type, for example, it may include suitable rotating or oscillating vanes or arms in an evacuated receiving chamber 64 to receive and mix the resin components. Chamber 64 may be evacuated by vacuum pump 50, as shown, to insure that the resin component mixture remains degassed. The vanes or arms may be rotated by any suitable motor 66 and shaft 67, which may be mounted on porting block 60. Chamber 64 and the mixed resin components may then be connected to a dispensing section through appropriate piping and a nozzle 68.

The piping and nozzle 68 may be passed through and vacuum sealed within the wall of a vacuum chamber 70 by appropriate seals and gaskets (not shown). Chamber 70 may be adapted, through suitable doors or openings, to receive the mold container, or the like, such as container 72, which may be filled with the resin component mixture and to be evacuated by vacuum pump 50 to the desired low degassing pressure. Container 72, as shown, may then be filled with the resin system from nozzle 68 as mixed in chamber 64.

Figure 2:
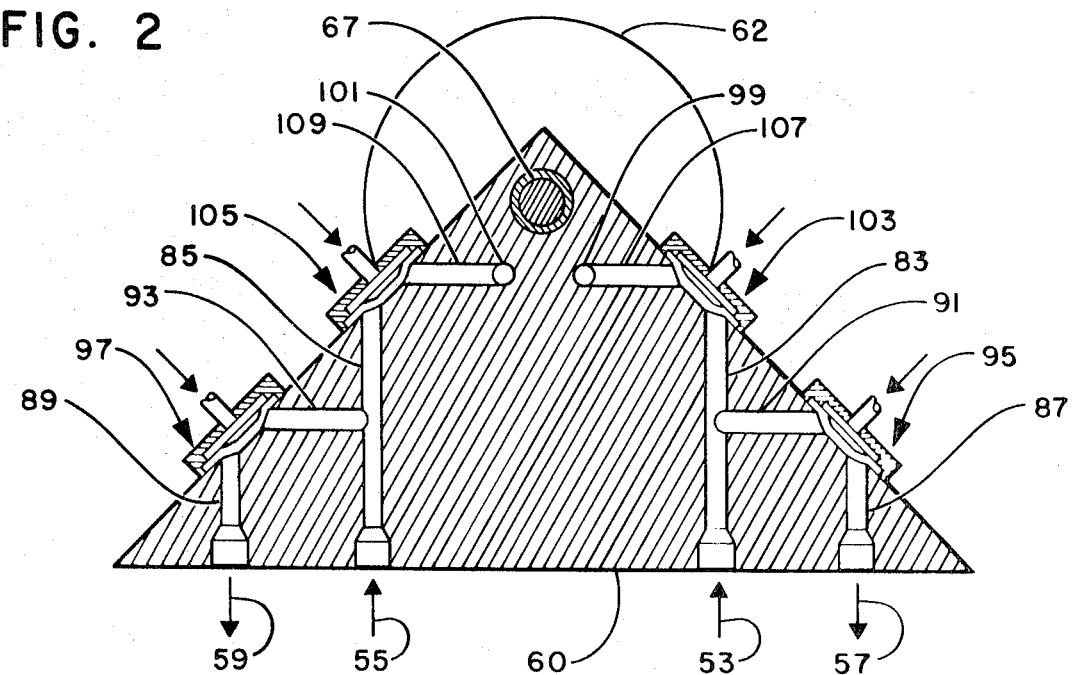
FIG. 2 is a cross-sectional top view of a typical porting mechanism or block which is shown diagrammatically in FIG. 1.

Referring to FIG. 2, porting block 60 as used in FIG. 1 may include an inlet and return passageway or bore for each resin component preparation section, such as inlet bores 83 and 85 coupled to lines 53 and 55 of sections 10 and 12, respectively, and return bores 87 and 89 coupled to recycling lines 57 and 59. Inlet bores 83 and 85 are in turn coupled to return bores 87 and 89 by interconnecting bores 91 and 93 through valves 95 and 97 respectively. Inlet bores 83 and 85 are also coupled to dispensing outlet nozzles or channels 99 and 101 by valves 103 and 105 and bores 107 and 109 respectively. Channels 99 and 101 are coupled to the interior of chamber 64 of mixer 62.

Valves 95, 97, 103 and 105 may be any appropriate fluid pressure activated valve, such as the diaphragm valves shown, which may be activated by pressurized gas system 48 in FIG. 1. A preferred operation of the valves is described below with respect to FIG. 3.

Shaft 67 of motor 66 may be rotatably sealed within porting block 60, as shown, to provide a vacuum seal for shaft 67 into chamber 64 of mixer 62 from porting block 60.

Porting block 60 directs the flow of resin components either into the mixing chamber 64 or back to the degassers. In addition, by appropriate timing devices controlling the diaphragm valves, porting block 60 may also meter precise amounts of resin components into the mixing chamber. It has been found that positive control of both types of flow may be achieved by applying a positive pressure to all valves at one or another pressure level at all times.

For example, under recirculation operating conditions, valve 105 may be positively closed by a first high pressure ($P_1$) while valve 97 may have a second pressure ($P_2$) lower than $P_1$ applied thereagainst. With $P_2$ applied to valve 97 any pressure difference created by the vacuum in chamber 16 of the degasser 14 may not pull resin components past the valve though the metering pump 56 pressure can force resin component to recirculate. Recirculation is thus determined by metering pump 56. It is understood, of course, that such pressures may be simultaneously applied to other valve systems in the porting block, such as valves 103 and 95. Thus, each resin component may be independently controlled to be recirculated either concurrently or at different times with respect to each of the other resin components channeled through porting block 60.

Figure 3:
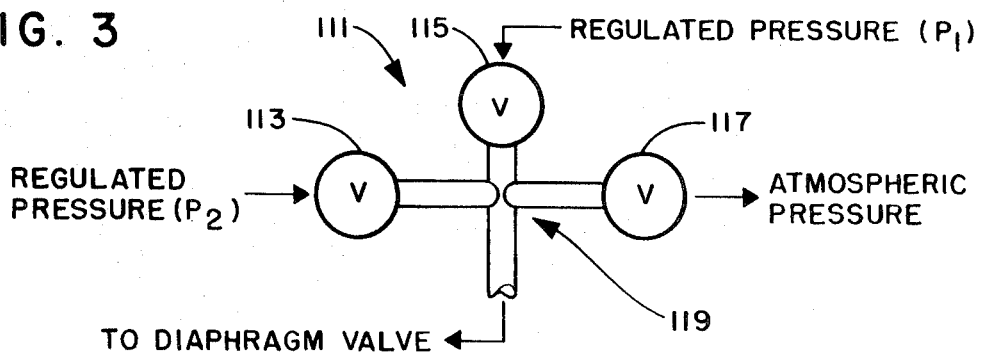
FIG. 3 is a schematic diagram of a valve control arrangement for the porting mechanism of FIG. 2.

In a typical operation, pressure $P_1$ may be about 90 to 100 p.s.i. with a pressure $P_2$ of about 0 to 60 p.s.i. These pressures may be supplied by pressurized gas system 48 with appropriate control devices, valves and pressure regulators through a valve arrangement 111 as illustrated in FIG. 3. Each diaphragm valve, valves 95, 97, 103 and 105 of porting block 60 may be connected through a separate valve arrangement 111, as illustrated, to pressurized gas system 48. Valve arrangement 111 may include a first two-way valve 113 connected to regulated pressure $P_2$ derived from system 48, a second two-way valve 115 connected to regulated pressure $P_1$ of system 48 and a third two-way valve 117 connected to ambient or atmospheric pressure. The outlet of valves 113, 115 and 117 may be joined in interconnecting coupling 119 to piping connected to the respective diaphragm valve. Valves 113, 115 and 117 may be conventional manual valves or solenoid operated valves actuated by suitable electrical relay and timer control circuits to provide any desired sequence of operation.

By way of example, under recirculation operating conditions, the valve arrangements 111 for each of valves 95 and 97 of FIG. 3 may have valve 113 open and valves 115 and 117 closed while those for each of valves 103 and 105 may have valve 115 open and valves 113 and 117 closed.

When feeding resin components into mixer 62 through channels 99 and 101 of porting block 60, precise control and metering of flow may be achieved with valve arrangement 111 including complete blocking of flow with valves 103 and 105 closed and complete assurance of rapid valve closure and opening. Without these features, reliable and repeatable flow metering may not be achieved.

Figure 4:
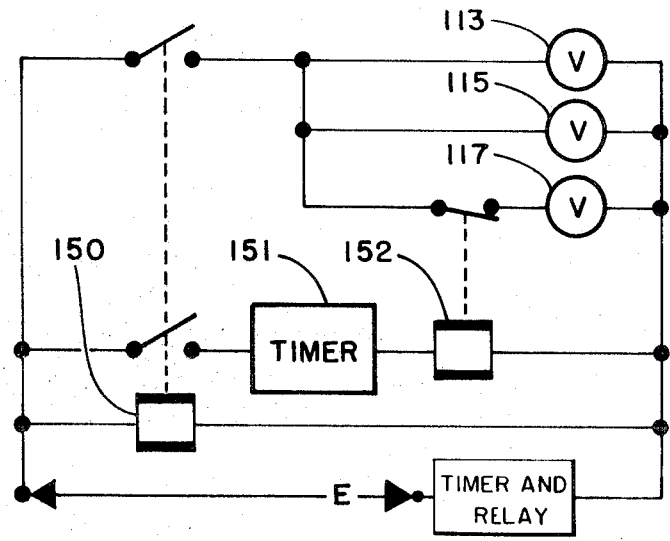
FIG. 4 is a schematic diagram of a circuit which may be used to control the valve arrangement shown in FIG. 3.

An operating sequence which may be used to achieve rapid opening of the porting block diaphragm valves 103 and 105 starting with valve 115 open and valves 113 and 117 closed included simultaneously closing valve 115 and opening valves 113 and 117 and after a predetermined time closing valve 117. Valve 117 permits the pressure against the diaphragm valves 103 and 105 to rapidly switch from the high pressure, $P_1$ level to the lower pressure $P_2$ level. The diaphragm valves 103 and 105 may be held open for a desired length of time to permit a metered quantity of resin component to flow into mixer 62 determined by the flow rate produced by metering pump 56. When the desired metered quantity of resin component enters mixer 62, valves 103 and 105 may be closed by opening valve 115 and closing valve 113. Such an operating sequence may be achieved using solenoid valves and the control circuit illustrated in FIG. 4 with a normally open valve 115 and normally closed valves 113 and 117. In operation, when a voltage, E, is applied to the circuit of FIG. 4, ganged switch 150 is activated to open normally closed valves 113 and 117, to close normally open valve 115, and to start timer mechanism 151. After a predetermined time, timer 151 deactivates switch 152 to allow valve 117 to resume its normally closed state.

It will be apparent that the pressure level of $P_1$ may be selected to provide rapid closing of the diaphragm valves regardless of any other pressures applied to the valves. $P_2$ may be at a level which provides positive control of flow during open conditions.

The resin dispensing system may be calibrated by placing separate test tubes or other containers below each resin component feed channel of porting block 60 within an evacuated chamber and the timers and control circuits adjusted to provide the desired metered quantities of each resin component. Additional control may be achieved by adjusting pressure $P_2$ applied to valve 113.

Resin mixtures may be dispensed from this system with reliable and repeatable resin component mixing ratios without any detectable resin foaming. The dispensing system is readily adaptable by proper selection of control circuits and timers to provide automated or semiautomated operation for any combination or number of resin components.

It will be understood that various changes in the details, materials and arrangements of the parts, which have been herein described and illustrated in order to explain the nature of the invention, may be made by those skilled in the art within the principles and scope of the invention.

What is claimed is:

1. A system for mixing and dispensing the components of a resin system comprising a resin component feed section for each resin component each including an evacuatable liquid film degassing device having means for recycling the resin component as a film in an evacuatable space to degas the component, means for feeding additional resin component into said degassing device, and means for removing the degassed component from the degassing device; a mixing section including an evacuatable mixing chamber for receiving and mixing said components, a porting mechanism having a dispensing outlet into said mixing chamber and an inlet for each of said resin components, a first selectively controllable normally open diaphragm valve between each of said inlets and said dispensing outlets, conduits interconnecting each component inlet, outlet and first diaphragm valve, means including a conduit and second selectively controllable normally open diaphragm valve in said porting mechanism communicating with said interconnecting conduits to said component inlets for recycling each of said resin components from said component inlets to said degassing device, a cluster of selectively controllable valve means associated with each of said diaphragm valves, each cluster including controllable valve means for applying a first positive pressure to each of said porting mechanism diaphragm valves to close said valves, controllable valve means for applying a second lower positive pressure to each of said diaphragm valves for holding said diaphragm valves in a controlled open position, controllable valve means for initially applying and thereafter terminating a third pressure lower than said second pressure simultaneous with said second pressure to said diaphragm valves for insuring rapid opening thereof, first control means for closing each of said first pressure applying valve means and disconnecting said first pressure from said diaphragm valves and for opening said second and third pressure applying valve means and connecting said second and third pressures to said diaphragm valves, second control means for closing each of said third pressure applying valve means and disconnecting said third pressure from said diaphragm valves when the diaphragm valves reach said second pressure and full open condition, and means for coupling said removed degassed components to the respective porting mechanism inlets; a dispensing section including an evacuatable chamber and a dispensing nozzle disposed in said evacuatable chamber and connected to said mixing chamber for receiving said mixed resin components and dispensing the same into said evacuatable chamber for use therein and means for simultaneously evacuating said degassing device space, said mixing chamber and said resin receiving chamber to substantially the same pressure.

2. The system of claim 1 including third control means for closing each of said second pressure applying valve means and disconnecting said second pressure and for simultaneously opening said first pressure applying valve after a predetermined time for metering a preselected quantity of resin components into said mixing chamber.

3. The system of claim 2 wherein said valve means include solenoid-controlled valves and said first, second and third control means include means for energizing said solenoids and a timing device for deenergizing the solenoid associated with said third pressure-applying valve to close said valve and relay means for initially energizing said timer and the solenoids associated with said first and second pressure-applying valves.

4. A process for mixing and dispensing components of a resin system comprising distributing the resin components as a film, degassing the resin in said film, passing said degassed resin from said film to a first diaphragm valve, applying a first pressure to said first diaphragm valve closing said first valve, passing said resin component past a second diaphragm valve associated with said first diaphragm valve and at a second pressure lower than said first pressure for opening said second diaphragm valve and cycling said resin component to said film degassing, thereafter simultaneously applying said second pressure and a third pressure lower than said second pressure to said first diaphragm valve and applying said first pressure to said second diaphragm valve releasing said resin component into a mixing chamber and closing said second diaphragm valve, simultaneously with said feeding of resin component maintaining said mixing chamber under vacuum drawing resin component thereinto, correspondingly distributing, degassing and passing another resin component through an additional similarly pressure controlled first and second diaphragm valves arrangement feeding the another resin component into said mixing chamber; simultaneous with passing of resin components into said mixing chamber mixing said components; dispensing said mixed resin components into an evacuated chamber; and applying said first pressure to said first diaphragm valves ending flow of resin components therethrough and simultaneously applying said second pressure to said second diaphragm valves recycling said resin components for degassing.

* * * * *